United States Patent
Hicks et al.

(10) Patent No.: US 9,459,005 B2
(45) Date of Patent: Oct. 4, 2016

(54) STEAM CYCLE EFFICIENCY IMPROVEMENT WITH PRE-ECONOMIZER

(75) Inventors: Timothy E. Hicks, Orrville, OH (US); John E. Monacelli, Uniontown, OH (US)

(73) Assignee: The Babcock & Wilcox Company, Baberton, OH (US)

(*) Notice: Subject to any disclaimer, the term of this patent is extended or adjusted under 35 U.S.C. 154(b) by 793 days.

(21) Appl. No.: 13/217,833

(22) Filed: Aug. 25, 2011

(65) Prior Publication Data

US 2012/0048215 A1   Mar. 1, 2012

Related U.S. Application Data (60) Provisional application No. 61/379,204, filed on Sep. 1, 2010.

(51) Int. Cl.
| | |
|---|---|
| *F22D 1/00* | (2006.01) |
| *F22B 31/04* | (2006.01) |
| *D21F 5/20* | (2006.01) |
| *F22D 1/32* | (2006.01) |

(52) U.S. Cl.
CPC ............. *F22B 31/045* (2013.01); *D21F 5/20* (2013.01); *F22D 1/32* (2013.01); *Y02E 20/12* (2013.01)

(58) Field of Classification Search
CPC .................................. F22D 1/00; F22D 1/32
USPC ......... 122/1 C, 7 R, 459, 460, 467, 477, 481
See application file for complete search history.

(56) References Cited

U.S. PATENT DOCUMENTS

| | | | | |
|---|---|---|---|---|
| 3,325,992 | A | * | 6/1967 | Sheldon .................... F01K 7/38 122/7 R |
| 5,762,031 | A | * | 6/1998 | Gurevich ...................... 122/7 R |
| 5,769,156 | A | | 6/1998 | Storbacka |
| 5,787,844 | A | | 8/1998 | Paju |
| 5,918,570 | A | * | 7/1999 | Gilchrist ....................... 122/452 |
| 2002/0194849 | A1 | | 12/2002 | Saviharju et al. |
| 2003/0101726 | A1 | | 6/2003 | Marin et al. |

(Continued)

FOREIGN PATENT DOCUMENTS

| | | | |
|---|---|---|---|
| CN | 86105222 | * | 6/1987 |
| CN | 86105222 A | | 6/1987 |

(Continued)

OTHER PUBLICATIONS

Australian Patent Examination Report No. 1, Issue Date: Dec. 8, 2015, Appl. No. 2011218668.

(Continued)

*Primary Examiner* — Steven B McAllister
*Assistant Examiner* — Ko-Wei Lin
(74) *Attorney, Agent, or Firm* — Michael J. Seymour; Christopher L. Smith; Eric Marich (57) ABSTRACT

A method for improving pulp mill steam cycle efficiency includes the steps of providing at least one deaerator tank having a first pressure, and lowering the pressure of said deaerator tank to a second pressure. Feedwater is supplied to a pre-economizer, where it is heated. The water is then delivered to at least one feedwater heater, where it is heated. The water is then delivered to an economizer. By this method boiler steam rate is increased while boiler efficiency is maintained and turbine extraction for deaerator and feedwater heating is minimized.

13 Claims, 6 Drawing Sheets

(56) References Cited

U.S. PATENT DOCUMENTS

| | | | | |
|---|---|---|---|---|
| 2004/0261729 | A1* | 12/2004 | Sarkar | 122/459 |
| 2006/0236696 | A1 | 10/2006 | Saviharju et al. | |
| 2009/0241860 | A1 | 10/2009 | Monacelli et al. | |
| 2010/0170247 | A1 | 7/2010 | Bommareddy et al. | |

FOREIGN PATENT DOCUMENTS

| WO | 2009144369 | A2 | 12/2009 |
|---|---|---|---|
| WO | 2010046730 | A1 | 4/2010 |

OTHER PUBLICATIONS

Chinese Notice of the First Office Action, Dated: May 22, 2014, Appl. No. 201110324898.4.

Extended European Search Report Communication, Dated: Feb. 24, 2012, Appl. No. 11179701.5-2124.

New Zealand Examination Report, Dated Sep. 5, 2011, Appl. No. 594871.

Taiwanese Examination Report/Office Action and Search Report, Dated: Jan. 26, 2016, Appl. No. 100130912.

* cited by examiner

STEAM CYCLE EFFICIENCY IMPROVEMENT WITH PRE-ECONOMIZER

CROSS-REFERENCE TO RELATED APPLICATIONS

The application is a non-provision application, claiming priority from Provisional Patent Application Ser. No. 61/379,204, filed on Sep. 1, 2010, which is incorporated herein by reference.

FIELD AND BACKGROUND OF THE INVENTION

1. Field of the Invention

The present invention relates generally to the field of power generation, and industrial boiler design. In particular, the present invention provides a new and useful system and method which employs a pre-economizer to achieve an increase in power-generating capability in a pulp mill setting.

2. Description of Related Art

Pulp and paper mills are constantly seeking ways to increase the power output and efficiency of steam generators. Raukola et al., in a technical paper entitled "Increasing Power Generation with Black Liquor Recovery Boiler" presented at the 2002 TAPPI Fall Conference & Trade Fair, describe several approaches. These include: increased dry solids content of the black liquor to increase boiler efficiency; air preheating with extraction steam from the steam turbine; taking lower pressure sootblowing steam from extraction steam from the steam turbine, rather than from after the primary superheater, in order to extract more useful work from the steam; in back-pressure steam turbine installations, not throttling the back-pressure steam in order to increase feedwater temperature; employing high-pressure feed water preheaters using extraction steam from the steam turbine; increasing main steam temperature and pressure (noting, however, that corrosion of the furnace walls and in the superheater area are the biggest concerns related to this approach); providing a reheater arrangement where the main steam, after expanding through the turbine, is sent back to the boiler to be superheated again before the next turbine stage; employing a condensing steam turbine instead of a back-pressure steam turbine; and employing heat recovery after the electrostatic precipitator to replace back-pressure steam used normally for preheating and thus releases steam to be used for power generation with the condensing turbine.

Typically, pulp mills use 40 psig to 70 psig of steam to heat water in their deaerator tanks. This heats the feedwater to temperatures of 290° F. to 315° F. Steam used to heat the deaerator tank is extracted from a turbine and reduces power generation by removing turbine steam available for the condenser. Since pulp mills have a considerable volume of make-up process water, this can be a substantial steam load.

Increasing the feedwater temperature by either increasing the DA pressure or adding a feedwater heater will increase the boiler's steam generation but will concomitantly increase the boiler's exit gas temperature and reduce boiler efficiency. Increasing the feedwater heating will also increase the turbine extraction and reduce power generation.

Figure 1:
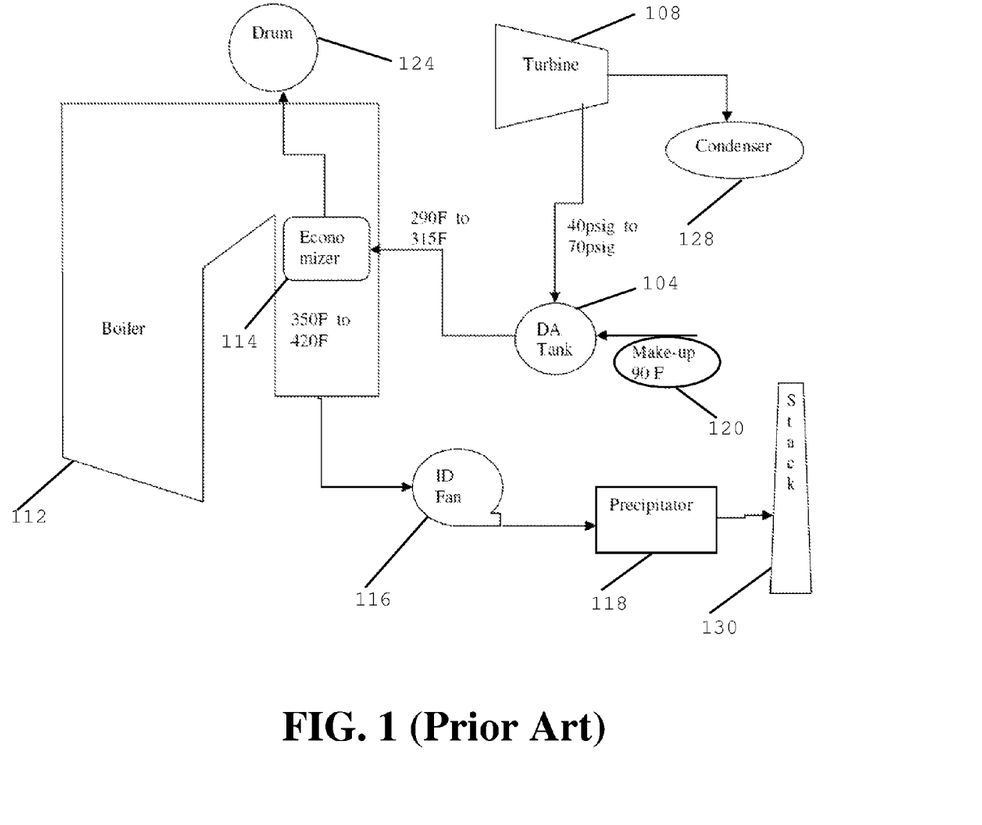
FIG. 1 is a schematic representation of a typical prior art arrangement.

As shown in FIG. 1, pulp mills have historically accepted exit gas temperatures of 350° F. to 420° F. as dictated by the feedwater temperature.

Figure 2:
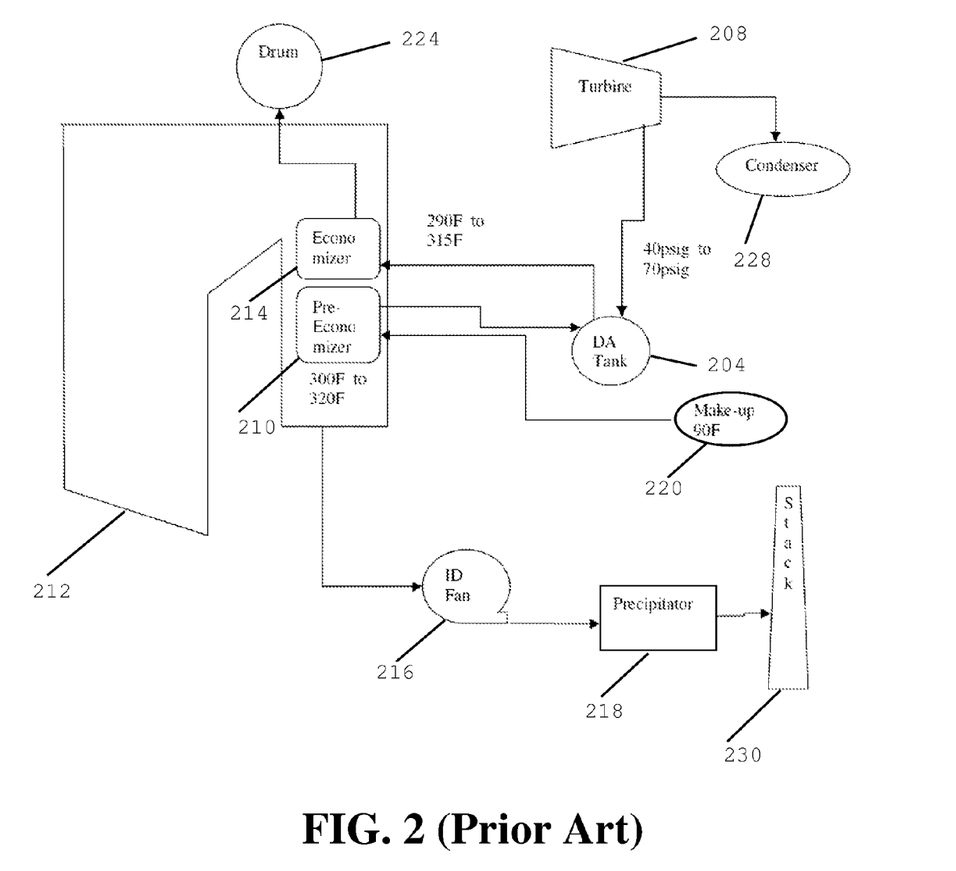
FIG. 2 is a schematic representation of a prior art arrangement in which the water is delivered to the pre-economizer before the deaerator tank.

As shown in FIG. 2, one proposed alternative solution has been to perform feedwater heating of the make-up water in a pre-economizer before delivery to the DA tank. This is problematic, however, since the water still has air and other corrosive gases and volatile compounds in it. Also pH control is usually performed after the DA tank since the DA tank will drive off the volatiles used for pH control. Further, the tubes in the pre-economizer are subject to corrosion as a result of moisture condensing on the outside of the tube as a result of the low water temperatures of the makeup water. This arrangement was shown in the paper "A Cost Benefit Assessment of Biomass Gasification Power generation in the Pulp & Paper Industry," 8 Oct. 2003, Larson. However, the paper fails to teach how the authors would overcome the difficulties of corrosion in the economizer before the DA tank.

SUMMARY OF THE INVENTION

It is an object of the present invention to provide a cost-effective way to increase available low-pressure steam.

It is a further object of the present invention to provide a cost effective way to increase power generation.

Embodiments of the present invention may be utilized as part of a new boiler or as an independent upgrade to an existing boiler.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DETAILED DESCRIPTION OF THE PREFERRED EMBODIMENTS

Figure 3:
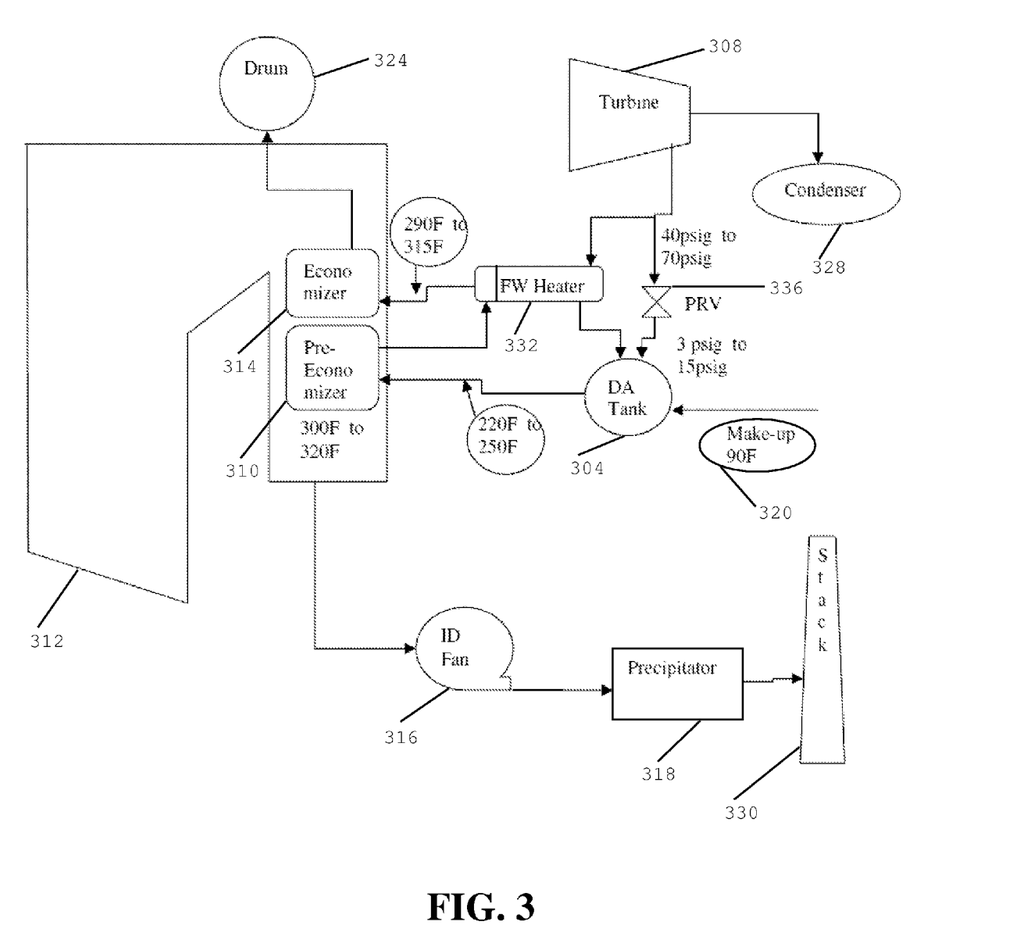
FIG. 3 is a schematic representation of an embodiment of the present invention with an integrated pre-economizer.

Referring to the drawings generally, wherein like reference numerals designate the same or functionally similar elements throughout the several drawings, and to FIG. 3 in particular, there is shown a schematic illustration of a first embodiment of the present invention, comprising a pre-economizer employed as part of a steam cycle steam turbine installation, generally referred to as 300. In this and the following figures, and solely for the sake of convenience to the reader, the "300" series of reference numerals refer to elements in FIG. 3, while the "400" series of reference numerals refer to elements in FIG. 4, etc. Similarly, the last two numbers in the various reference numerals designate the same or functionally similar elements throughout the several drawings; e.g., 310, 410, 510 etc. refers to the pre-economizer in FIGS. 3, 4 and 5 etc. Also, temperatures (degrees F.), pressures (pounds per square inch gage or absolute—psig, psia) and flow rates (thousands of pounds per hour—kpph) are provided merely for illustrative purposes and are not intended to limit the scope of the present invention The deaerator, generally referred to herein as the DA tank 304, will effectively remove air and other corrosive gases at pressures much closer to atmospheric. Lowering the pressure to the DA tank 304 to close to atmospheric pressure will allow the feedwater temperature to be lowered to between 220° F. and 250° F. This may be achieved by a pressure reducing valve 336 or by extracting from the turbine 308 at a much lower pressure. Thereupon, the feedwater 320 is sent to a pre-economizer 310 inside the boiler 312. This will reduce the exit gas temperatures as low as 300° F. After the water is heated in the pre-economizer 310, it is then delivered from the boiler 312 and heated with a feedwater heater (or heaters) 332. The water is then delivered to an economizer 314 located in the boiler 312. This will increase the boiler steam rate while maintaining boiler efficiency and minimizing turbine extraction for DA and feedwater heating.

Table 1, below, demonstrates the improvement in power generation that may be achieved by lowering the DA pressure, installing the pre-economizer 310 according to the present invention, and maintaining the same feedwater temperature to the economizer.

| Parameter | State of the Art | Pre-Economizer |
|---|---|---|
| Boiler steam flow (kpph) | 700 | 700 |
| SH Temperature (F.) | 900 | 900 |
| SH Pressure (psia) | 1265 | 1265 |
| 165 psia extraction (kpph) | 90 | 90 |
| 75 psia process steam (kpph) | 382 | 382 |
| 90 F DA make-up water (kpph) | 490 | 490 |
| 75 psia DA + FWH steam flow (kpph) | 148 | 135 |
| 75 psia extraction (kpph) | 530 | 517 |
| Condenser flow (kpph) | 80 | 93 |
| Power Generated (MW) | 40.9 | 41.4 |

Embodiments of the present invention make the pulp mill more efficient by, among other things, making more process steam available and improving the power production capability of the plant.

Embodiments of the present invention also allow the exit gas temperature to be controlled by adjusting the steam to the feedwater heater 332 either in combination with or independent of adjusting the pressure to the DA tank 304. This will ensure that the gas temperature does not get too low and cause damage due to dew point corrosion.

Embodiments of the present invention also allow the exit gas temperature to be lowered. This will reduce the gas volume to the ID fan 316 and precipitator 318. Reduced gas volumes will improve the effectiveness of a precipitator 318 and reduce the load in the existing ID fan 316. This will improve existing precipitator 318 performance. In new installation embodiments, the additional benefit of reduced the size, cost and power consumption of the precipitator 318 and ID fan 316 may be observed vs., that of preexisting installation embodiments.

Figure 4:
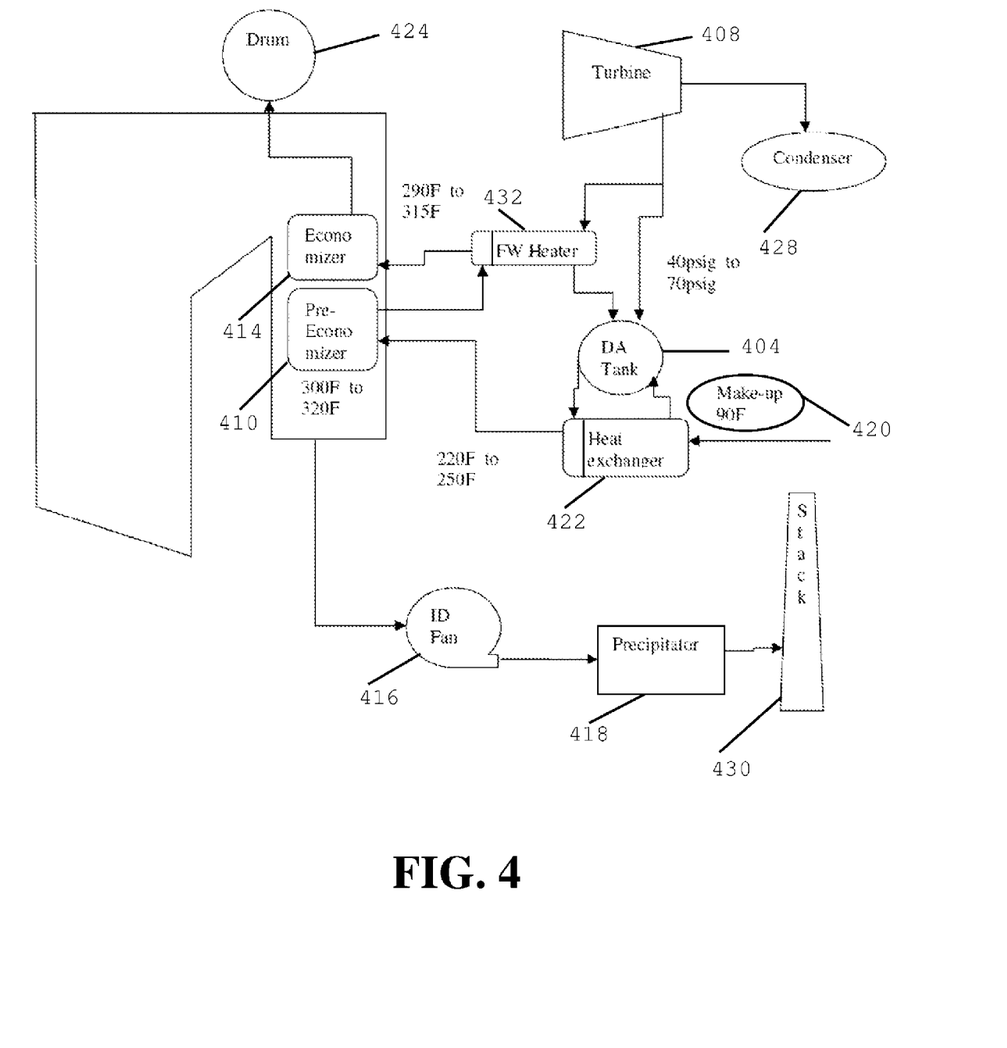
FIG. 4 is a schematic representation of an embodiment of the present invention demonstrating preheating make-up water with deaerator water using a feed water heater.

Certain similarities between the embodiment of FIG. 3 and those illustrated and described in later FIGs., as well as the additional advantages obtained thereby, will thus become apparent With reference to FIG. 4, which is a schematic illustration of a second embodiment of the present invention, generally referred to as 400, a heat exchanger 422 is installed after the DA tank 404 that removes heat from the feedwater and adds it to the incoming make-up water 420. This arrangement allows the pressure on the DA tank 404 to remain at the mill's low-pressure steam extraction.

Figure 5:
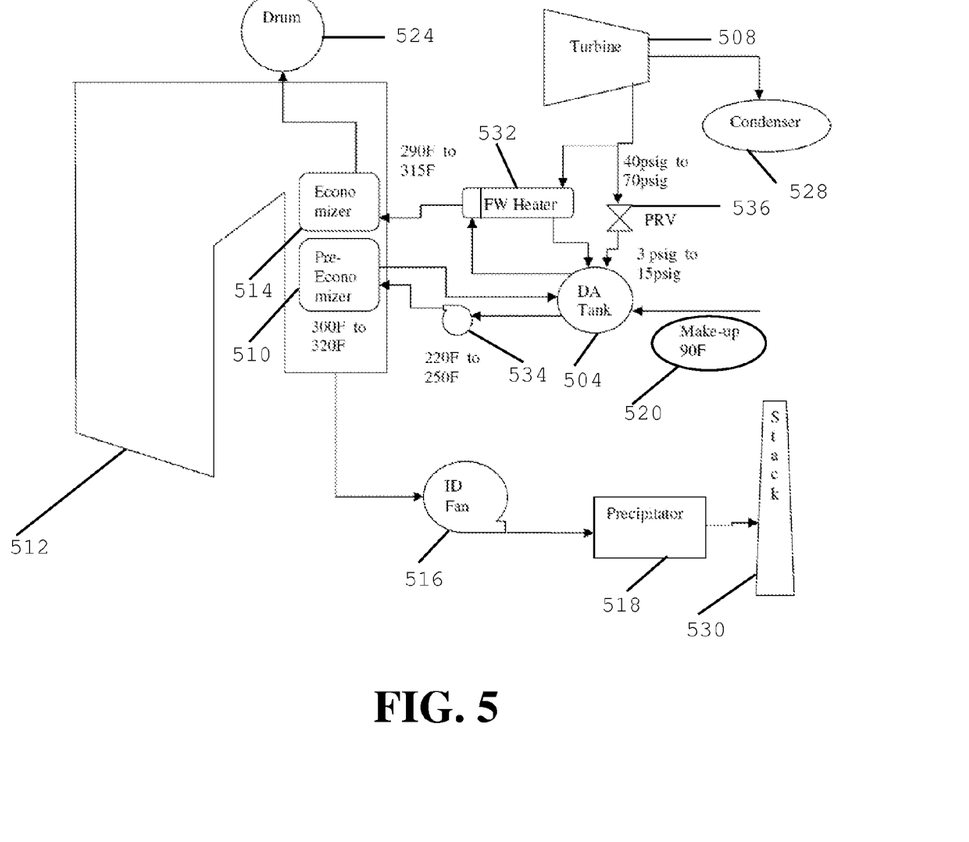
FIG. 5 is a schematic representation of an embodiment of the present invention demonstrating the pre-economizer with separate circulating pump.

With reference to FIG. 5, which is a schematic illustration of a third embodiment of the present invention, generally referred to as 500, make up water is delivered directly to the DA tank 504, which will effectively remove air and other corrosive gases at pressures much closer to atmospheric. A pressure reducing valve 536 is associated with the DA tank 504 for reducing the pressure therein to a level close to atmospheric. The feedwater 520 is then conveyed to the pre-economizer 510 with the assistance of a pump 534. After the water is heated in the pre-economizer 510 it is then delivered away from the boiler 512, back to the DA tank 504 and heated with a feedwater heater (or heaters) 532. The water is then delivered to the economizer 514.

Figure 6:
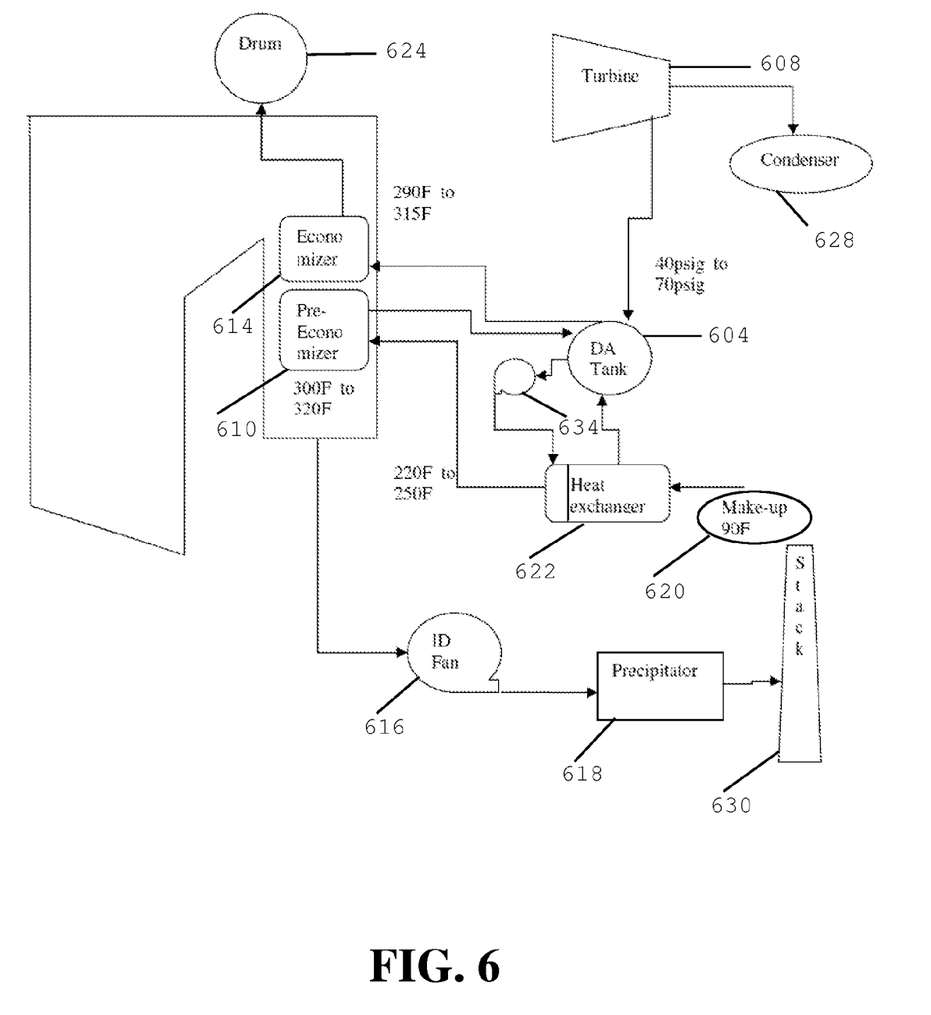
FIG. 6 is a schematic representation of an embodiment of the present invention demonstrating preheating make-up water with deaerator water without using a feed water heater.

With reference to FIG. 6, which is a schematic illustration of a third embodiment of the present invention, generally referred to as 600, make-up water is delivered to the heat exchanger 622 and, from there, to the DA tank 604. This is in contrast to the embodiment disclosed in FIG. 4, above, wherein water is delivered to the DA tank 404 before it is delivered to the heat exchanger 422. The DA tank 604, will effectively remove air and other corrosive gases at pressures much closer to atmospheric. By means of a pump 634, the feed water is conveyed back to the heat exchanger 622. From the heat exchanger 622, it is conveyed to the pre-economizer 610. After the water is heated in the pre-economizer 610, it is then delivered away from the boiler 612, back to the DA tank 604. From there, the feedwater is delivered to the economizer 614.

While a specific embodiment of the invention has been shown and described in detail to illustrate the application of the principles of the invention, it will be understood that the invention may be embodied otherwise without departing from such principles.

What is claimed is:

1. A system for pulp mill steam cycle operation, comprising:
    a deaerator tank with a plurality of fluidic connections adapted for receiving a supply of water, said deaerator tank operating at a pressure;
    a pre-economizer fluidically connected to said deaerator tank for receiving water therefrom, said pre-economizer being located inside a boiler and being fluidically connected to receive said supply of water from said deaerator tank, said pre-economizer also adapted for heating said supply of water;
    a feedwater heater located outside of the boiler and fluidically connected to said pre-economizer for receiving said supply of water from said pre-economizer and for heating said supply of water, the feedwater heater also being fluidically connected to a turbine to receive steam from the turbine for heating said supply of water;
    an economizer inside the boiler and directly fluidically connected to said feedwater heater, said economizer being fluidically connected to receive said supply of water directly from said feedwater heater;
    wherein the deaerator tank is fluidically connected to receive a supply of makeup feedwater directly from outside the system by a first conduit, to separately receive a supply of feedwater from a feedwater heater by a second conduit, and to separately receive a supply of steam from the turbine by a third conduit;

wherein the deaerator tank is fluidically connected to the pre-economizer by a fourth conduit, wherein the fourth conduit is the only fluidic connection for providing water to the pre-economizer, and wherein the fourth conduit is the only fluidic connection for water leaving the deaerator;

wherein a pressure reducing valve is in the fluidic path between the turbine and the deaerator, and the pressure reducing valve is adapted to lower the pressure of the deaerator tank to a second pressure.

2. The system of claim 1, wherein said second pressure is at or above atmospheric pressure.

3. The system of claim 1, further comprising a turbine for lowering the pressure of the deaerator tank to a second pressure.

4. The system of claim 3, wherein said second pressure is at or above atmospheric pressure.

5. The system of claim 1, further comprising a heat exchanger communicatively connected to said deaerator tank, said heat exchanger being adapted to add heat to said supply of water.

6. The system of claim 1, further comprising a heat exchanger fluidically attached to a supply of make-up water, said heat exchanger adapted to add heat to said supply of make-up water.

7. The system of claim 1,
wherein a pressure reducing valve is in a separate, direct fluidic path between the turbine and the deaerator, and the pressure reducing valve is adapted to lower the pressure of the deaerator tank to a second pressure.

8. A system for pulp mill steam cycle operation, comprising:
a deaerator tank fluidically connected for receiving a supply of makeup feedwater directly from outside the system by a first conduit, said deaerator tank operating at a pressure;
a pre-economizer fluidically connected to said deaerator tank for receiving water therefrom, said pre-economizer being located inside a boiler and being fluidically connected to receive said supply of water from said deaerator tank, said pre-economizer also adapted for heating said supply of water;
wherein the deaerator tank is directly fluidically connected to the pre-economizer by a pre-economizer conduit, wherein the pre-economizer conduit is the only fluidic connection for providing water to the pre-economizer, and wherein the pre-economizer conduit is the only fluidic connection for water leaving the deaerator;

a feedwater heater outside of the boiler fluidically connected to said pre-economizer for receiving said supply of water from said pre-economizer for heating said supply of water, wherein said feedwater heater is separately fluidically connected to receive steam from a turbine, and wherein the feedwater heater is adapted to use steam from the turbine to heat the supply of water received from the pre-economizer; and an economizer inside the boiler and fluidically connected to said feedwater heater, said economizer adapted to receive said supply of water from said feedwater heater.

9. A method for improving pulp mill steam cycle efficiency, comprising:
providing the system according to claim 8;
wherein the deaerator tank has a first pressure;
lowering the pressure of said deaerator tank to a second pressure;
providing said supply of makeup feedwater to the deaerator tank from outside the system through the first conduit;
delivering said supply of water from the deaerator tank to the pre-economizer through the pre-economizer conduit, said pre-economizer being located inside a boiler arrangement;
heating said supply of water in said pre-economizer;
delivering said supply of water away from said boiler arrangement to at least one feedwater heater, said feedwater heater being fluidically connected to said boiler arrangement;
heating said supply of water by said at least one feedwater heater; and
delivering said supply of water to an economizer located in said boiler.

10. The method of claim 9, wherein the pressure of the deaerator tank is lowered by employing a pressure-reducing valve.

11. The method of claim 10, wherein said second pressure is at or above atmospheric pressure.

12. The method of claim 9, wherein the pressure of the deaerator tank is lowered by extracting from a turbine at a lower pressure than the first pressure.

13. The method of claim 12, wherein said second pressure is at or above atmospheric pressure.

* * * * *